United States Patent [19]
Cheo et al.

[11] 3,860,934
[45] Jan. 14, 1975

[54] UNAMBIGUOUS PHASE INTERFEROMETER ANTENNA

[75] Inventors: Bernard Ru-Shao Cheo, Teaneck, N.J.; Lester H. Kosowsky, Stamford, Conn.; Peter W. Smith; An-Hwa Soong, both of Westport, Conn.

[73] Assignee: United Aircraft Corporation, East Hartford, Conn.

[22] Filed: Aug. 2, 1973

[21] Appl. No.: 385,205

[52] U.S. Cl. ............... 343/778, 343/844, 343/853, 343/113 R
[51] Int. Cl. .......................................... H01q 13/00
[58] Field of Search ........... 343/771, 776, 778, 854, 343/113 R, 844, 853

[56] References Cited
UNITED STATES PATENTS

| | | | |
|---|---|---|---|
| 2,489,288 | 11/1949 | Hansen | 343/771 |
| 3,380,053 | 4/1968 | Connolly | 343/854 |
| 3,508,276 | 4/1970 | Rope et al. | 343/785 |
| 3,754,272 | 8/1973 | Goldstone | 343/778 |

Primary Examiner—Eli Lieberman
Attorney, Agent, or Firm—M. P. Williams

[57] ABSTRACT

An ambiguity free phase interferometer antenna system, having arbitrarily high gain characteristics and fine resolution, is provided by a pair of separately fed, forward-looking antennas, each having an amplitude distribution across its aperture of substantially $A(y) = Ae^{\pm \alpha y}$. The antenna system may comprise a pair of isolated surface wave antennas, a pair of tilted leaky wave antennas, a pair of specially designed, exponential aperture horn antennas, or an array of a large number of closely spaced individual radiating elements having a suitable composite radiation pattern.

5 Claims, 8 Drawing Figures

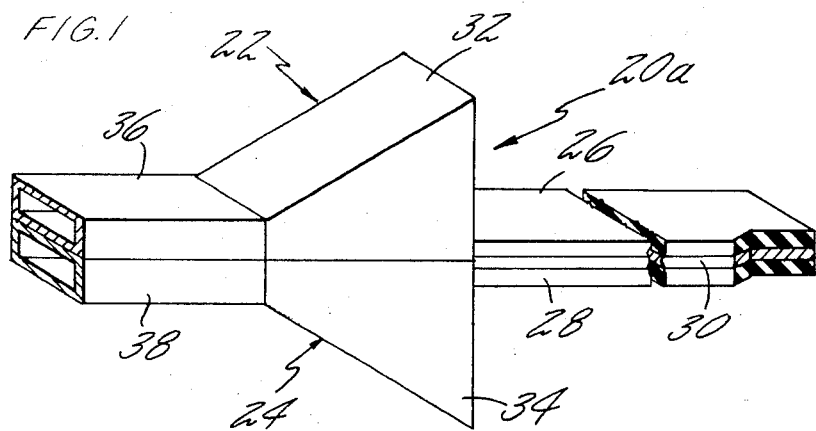
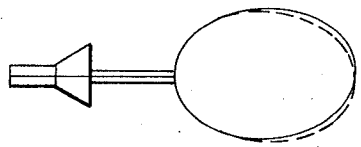
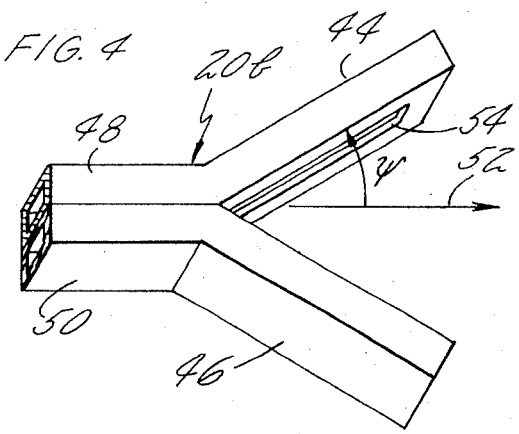
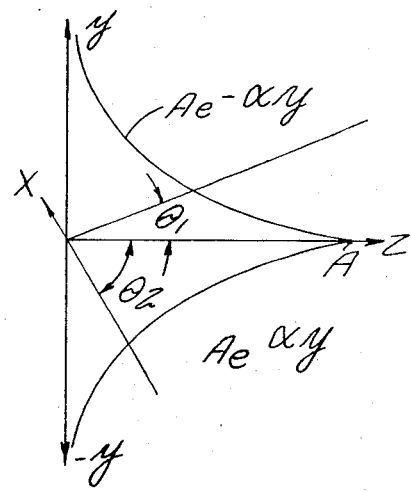
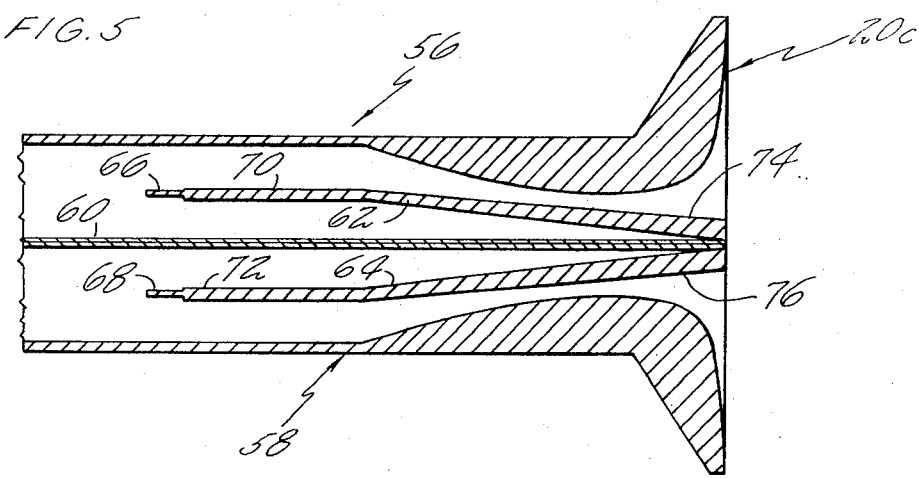

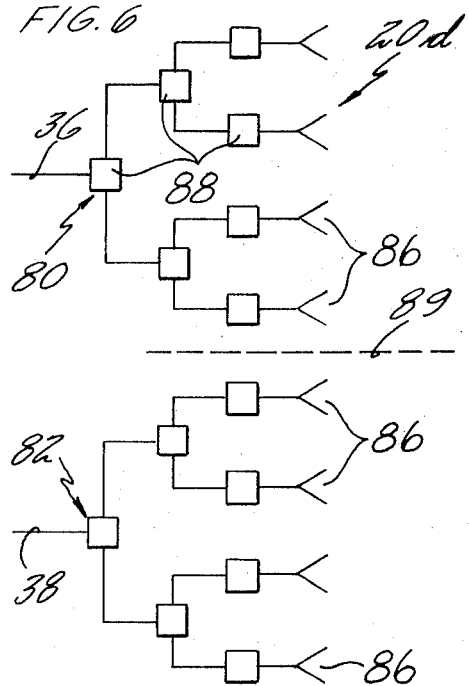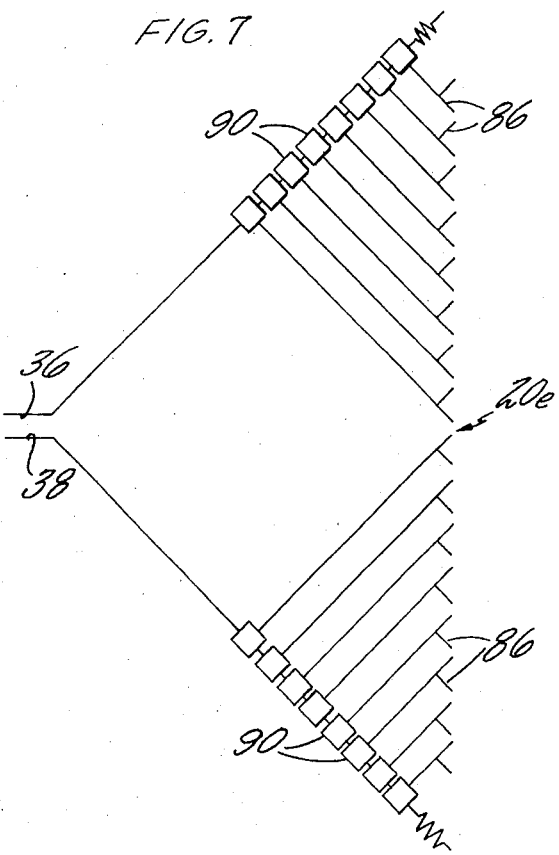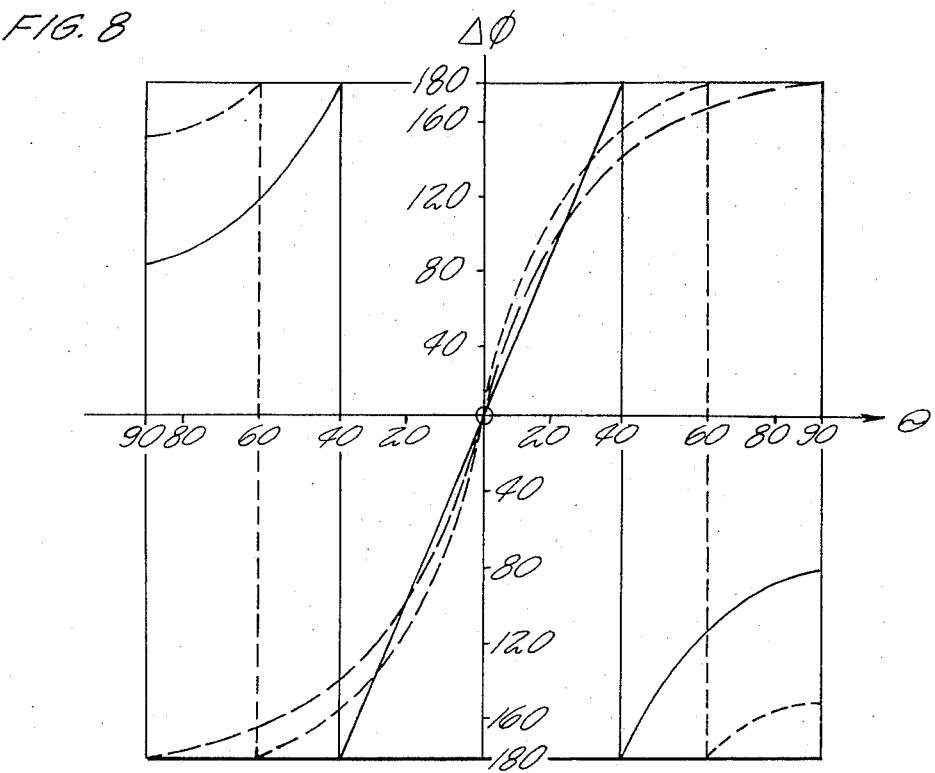

UNAMBIGUOUS PHASE INTERFEROMETER ANTENNA

BACKGROUND OF THE INVENTION

1. Field of Invention

This invention relates to radar antennas, and more particularly to high gain, high resolution ambiguity-free phase interferometer antenna systems.

2. Description of the Prior Art

As is known in the prior art, phase interferometer radar sytems are capable of determining the angle of incidence of a radar wave impinging on the antenna system thereof system thereof as a result of a single pulse of transmitted energy reflecting from objects or targets within the illumination pattern of an associated transmitter. The phase interferometer system measures the difference in phase of waves received at two antennas displaced from one another in a plane within which angular incidence of a returned wave is to be measured. Because the two antennas are displaced, only signals which are incident in a direction parallel to the boresight of the two antennas will be received at both antennas simultaneously. At any angle off of boresight, the incoming wave will arrive at one antenna prior to the other. This results in a difference in phase of the incoming wave as simultaneously received by the two antennas. If the antennas are very close together, the difference in phase for a corresponding angle of incidence will be relatively low and therefore the sensitivity of the system is relatively low. To increase the sensitivity, the antennas are separated by a greater distance; however ambiguity exists whenever this distance is on the order of magnitude of a half wavelength, or greater.

Many schemes have been devised to overcome the ambiguity. However, most of these are extremely complex, and are valid only to the extent that the related technology is implemented so as to overcome problems associated with circuit phase shifts, temperature instability and so forth. In many applications, it is desirable to provide a phase interferometer system which can measure a wide range of angles, such as from nearly straight down below the aircraft to nearly straight up above the aircraft. If the antenna spacing in such systems is such as to create more than a single discontinuity in each quadrant (that is, where the electrical phase can change by 180° for variations in angle of incidence of 90° or less), then the problem becomes so compounded as to be incapable of practical solution. In fact, prior practical systems are limited to incidence of about ±20° for unambiguous operation (depending on scale factor or sensitivity).

SUMMARY OF INVENTION

The object of the present invention is to provide improved phase of interferometer antenna systems.

This invention is predicated on the discovery that the phase of the far field wave at any given angle with respect to the reference plane of an ideal antenna having an exponential aperture distribution is a single valued function of said angle (for angles of incidence up to 90°); and, due to the reciprocal relationship between waves and antennas, the phase of a signal developed at the feed of such an antenna as a result of a plane wave incident thereon from a direction at a given angle with respect to a reference plane (which may include the antenna boresight) is single valued with respect to said angle.

According to the present invention, a pair of separately fed antennas having substantially an exponential aperture distribution, $A(y) = Ae^{\pm \alpha y}$, are disposed with parallel boresights and on opposite sides of and mutually adjacent to a reference plane.

According further to the present invention, an interferometer antenna system having a pair of isolated substantially exponential aperture antennas may be comprised of surface wave antennas, tilted leaky wave antennas, a pair of horns each having a substantially exponential aperture distribution, or a pair of arrays of a large number of closely spaced individual radiating elements, each array having a substantially exponential aperture distribution.

An exponential phase interferometer antenna system in accordance with the present invention ideally provides a completely unambiguous solution for the angle of incidence of a wave received thereat for angles between plus 90° and minus 90° with respect to the common antenna boresight, and in practical application, can triple the angular range of systems known to the art. The invention is simple to implement using readily available technology, and the signal processing used therewith is straight forward and readily achieved without undue complexity.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIG. 1 is a partially sectioned and broken away prespective view of an embodiment of the invention employing a pair of isolated surface wave antennas;

FIG. 2 is a plot of the aperture distribution of an antenna system in accordance with the present invention;

FIG. 3 is a schematic illustration of the radiation pattern of a surface wave antenna embodiment of the present invention;

FIG. 4 is a perspective view of an embodiment of the invention employing a pair of leaky wave antennas;

FIG. 5 is a sectioned, side elevation view of an embodiment of the invention employing a pair of exponential aperture horn antennas;

FIG. 6 is a schematic illustration of an embodiment of the invention employing a pair of multiple radiating element array antennas;

FIG. 7 is a schematic illustration of a variation of that of FIG. 6 having a constant phase serial feed; and FIG. 8 is a plot of angular sensitivity or scale factor of prior art systems, ideal systems, and practical antenna systems of the invention.

DESCRIPTION OF THE PREFERRED EMBOIDMENT

Phase interferometer systems known to the prior art employ antenna systems consisting of two receiving antennas, which typically have aperture distributions (that is, the distribution across the antenna of the amplitude of waves radiated therefrom, or, reciprocally, the amplitude response of the antenna with respect to waves incident thereon) which vary as the cosine, or are uniform, or of certain other distributions. Typically, the distance between the apparent phase centers (the points from which spherical waves apparently emanate) is the same for any angle of incidence of received waves. In such systems, waves incident upon the antennas at an angle, $\theta$, off of the normal to the line joining the two phase centers (boresight) enter the two antennas at differnt times, and therefore cause is in the signal processor portion of the phase interferometer radar which have a concomitant difference in electrical phase, $\phi$, the magnitude of which, measured in a phase comparator, provides an indication of the angle of reception of the waves. It is thus that the angular location of a target off of boresight is determined in a phase interferometer. The electrical phase difference, $\Delta\phi$ is given by $$\Delta\phi = 2\pi D/\lambda \sin \theta, \quad (1)$$

where $D$ is the distance between phase centers and $\lambda$ is the freespace wavelength. The sensitivity, or scale factor, at boresight of such an interfereometer is given by $$|d \Delta\phi/d \theta|_{\theta=0} = 2 \pi D/\lambda \quad (2)$$

Thus, to increase the sensitivity of the interferometer, it is necessary to increase the ratio $D/\lambda$. From equation (1) it is seen that $$\sin \theta = \Delta \phi (\lambda/2\pi D) \quad (3)$$

However, the electrical phase difference, $\Delta\phi$ can be determined unambiguously only for electrical phase differences between $-180°$ and $+180°$. Consider an interferometer system in which angles of incidence from straight down ($-90°$) to straight up ($+90°$) are to be measured. Then, considering the fact that the difference in electrical phase, $\Delta\phi$, can similarly only vary from $+180°$ to $-180°$ ($\pm\pi$), $$\sin (+90°) = \pi(\lambda/2\pi D) = 1 \quad (4)$$

$$\sin (-90°) = - \pi(\lambda/2\pi D) = -1 \quad (5)$$

so $$D/\lambda = \frac{1}{2} \quad (6)$$

And the maximum sensitivity at boresight, without ambiguity, form equation (2), is $$|d \Delta \phi/d\theta|_{\theta=0} = 2 \pi \cdot \frac{1}{2} = \pi \quad (7)$$

Any attempt to increase the sensitivity, by increasing the value of $D/\lambda$, introduces ambiguities since electrical phase differences of more than 360° become involved.

It has been found that in practical interferometer systems, boresight sensitivities on the order of seven or more are necessary in order to provide adequate sensitivity with respect to noise and other practical limitations of the system; less sensitivity results in systems which do not give satisfactory operation. This has been achieved in some systems with augmenting electronics, but only for spatial angles of incidence ($\theta$) of between on the order of $=20°$ and $+20°$. An example of such electronic improvement procedures is illustrated in a commonly owned patent of Frank S. Preston, U.S. Pat. No. 3,438,033. Heretofore it has not been possible to provide unambiguous operation in prior art interferometers for the full range of $-90°$ to $90°$: prior art interferometers are limited to operation over an extremely small range of spatial angles of incidence.

One aspect of interferometer antenna systems known to the prior art is the fact that the apparent separation of the phase centers ($D$) is the same for the antenna system without regard to the angle of incidence of the incoming wave.

The present invention is predicated in part on the discovery that an interferometer antenna system can operate satisfactorily if it has less than maximum sensitivity off of boresight, and provides maximum sensitivity at boresight. Further, the invention is predicated on the discovery that the sensitivity on and off boresight can be different provided there is a difference in the apparent distance between the phase centers of the two antennas comprising the interferometer antenna system for different angles of incidence. In addition, the invention is predicated in part on the discovery that the apparent distance between phase centers of a pair of antennas employed in an interferometer antenna system can be varied provided each of the antennas has a substantially exponential aperture distribution.

Consider now an interferometer antenna system composed of two, separate apertures disposed above and below a reference plane, and in which the aperture distribution of each antenna normal to the reference plane is given by $$A(y) = Ae^{-\alpha y} \quad (8)$$

where
 $A$ is the maximum aperture amplitude
 $y$ is the distance from the reference plane
 $e$ is the Naperian operator
and
 $\alpha$ is an attenuation constant related to the aperture distribution.

Equation (8) describes the manner in which the amplitude of a wave radiated by the antenna (or, reciprocally, the response of the antenna with respect to an incoming wave) falls off with distance of the point of transmission or reception of the wave at the aperture from the reference plane (the distance $y$). As is readily determined from known antenna theory, an antenna having the aperture distribution of equation (8) has a far field amplitude pattern given by the Fourier transform $$F(\theta) = \int_{-\infty}^{+\infty} Ae^{-\alpha y} e^{j\frac{2\pi}{\lambda} y \sin \theta} dy$$

Allowing $2\pi/\lambda$ to equal $\beta$, the propagation constant, the integral may be evaluated for each antenna of an interferometer system according to the invention in which equations (8) and (9) relate to an upper antenna, and in which there is a similar, separately fed lower antenna. For the upper antenna, $A = 0$ for $y$ related to angles of $\theta$ from $-\infty$ to $0$, and $$F(\theta) = 1/\sqrt{\alpha^2 + \beta^2 \sin^2\theta}\, e^{j\phi(\theta)} \qquad (10)$$

where $\phi(\theta) = \tan^{-1}(\beta\sin\theta/\alpha)$ \qquad (11)

The square root represents the amplitude in the far field and the exponential represents the phase in the far field. Similarly, for the lower antenna, $$\phi(\theta) = -\tan^{-1}(\beta\sin\theta/\alpha) \qquad (12)$$

Thus, each antenna is itself phase sensitive to $\theta$, even if both are located (ideally) at the same point in space. Due to the reciprocal nature of antennas, the phase difference between signals received at an angle of incidence of $\theta$ from the far field is the difference in the electrical phase between the upper and lower antennas and from equations (11) and (12), is seen to be $$\Delta\phi(\theta) = 2\tan^{-1}(\beta\sin\theta/\alpha \qquad (13)$$

Trigonometric examination of equation (13) shows that it is monotonic for angles of incidence ($\theta$) of $-90°$ to $+90°$, regardless of the value of the attenuation constant $\alpha$, or the value of the propagation constant $\beta$. The boresight sensitivity of an antenna having an aperture distribution of equation (8) is derived from equation (13) as.

$$|d\Delta\phi/d\theta|_{\theta=0} = 2\beta/\alpha = 2(2\pi/\lambda)\,1/\alpha, \qquad (14)$$

so that the sensitivity can be increased as much as desired (within practical limits) by reducing the value of $\alpha$, without introducing any ambiguities.

There are various classes of antennas having a substantially exponential aperture distribution which may be disposed so as to provide an interferometer antenna system according to the present invention. Although a purely exponential aperture distribution may be difficult to realize in a real system, the substantially exponential distributions which are realizable provide for unambiguous interferometer operation for angles of incidence of about ±40° or more, without any augmenting electronics of the type used in the prior art to broaden the range of unambiguous operation.

One class of devices suitable for combination in an interferometer antenna according to the present invention is the well known surface wave antenna, in which case a pair of surface wave antennas are disposed on opposite sides of an isolation reference plane. An ideal surface wave antenna inherently has an exponential aperture distribution, regardless of the particular form of the surface wave antenna utilized. Surface wave antennas are devices which include a surface (or an effective surface) capable of supporting the propagation of surface waves together with a suitable feed for launching a wave onto the surface. Some commonly used structures include dielectric sheets with or wihout a ground plane, dielectric rods, corrugated surfaces, ferrite or plasma sheets backed by a ground plane, and arrays of proximity-coupled dipoles, etc. Such antennas, and their characteristics and design requirements, are now well known, as illustrated by (1) Zucker, Francis J., "Surface—And Leaky—Wave Antennas," Chapter 16 of *Antenna Engineering Handbook* (Henry Jasic, Editor), McGraw-Hill, 1961 (Library of Congress Card No. 59-14455), and by (2) *IRE Transactions On Antennas and Propagation*, Volume Ap-7, December 1959, Special Supplement, Pgs. S 132-S296. Equation 16-4 of Zucker shows the aperture distribution of a surface wave antenna; although it is in slightly different form, it is readily understood that this is substantially the same (and fully equivalent) to equation (9) hereinbefore. Thus it is known that surface wave antennas do have an exponential aperture distribution; therefore, in accordance herewith, the angular sensitivity of a pair of such antennas suitably arranged in an interferometer antenna system in accordance with the present invention will have the sensitivity of equation (14).

A simplified illustration of one known form of surface wave antenna is illustrated in FIG. 1. Therein the interferometer antenna system 20a comprises a pair of surface wave antennas 22, 24 each including a dielectric sheet 26, 28 which are separated from each other by a common, conductive reference or ground plane 30. Each antenna also comprises a wave launching mechanism 32, 34 which may comprise some suitable form of horn or any other wave launching apparatus known to the art, which in turn is fed by a related waveguide 36, 38.

The known aperture distribution of a surface wave antenna is illustrated in FIG. 2 for a pair of antennas 22, 24 disposed with substantially a common boresight in mirror image relationship (FIG. 1). Therein, the Z axis denotes the direction in which the wave is launched and propagates along the surfaces of the dielectric sheets 26, 28 and may be thought of as lying along the boresight of the interferometer antenna system 20a. The Y axis is perpendicular to the dielectric sheets 26, 28, and the X axis is along the width of the antenna system 20a. The aperture distribution is shown in FIG. 2 to be exponential, and for angles above boresight where $y$ is positive, the aperture distribution is $Ae^{-\alpha y}$; for angles below boresight where $y$ is negative, the aperture distribution is $Ae^{\alpha y}$. The aperture, in this case, is at the right-hand end (as seen in FIG. 1) of the sheets 26, 28.

As is illustrated in FIG. 3, the radiation pattern 40, 42 of each surface wave antenna 22, 24 is very broad, so that the pattern of the interferometer antenna system 20a is similarly very broad. Although for angles near vertical the response of the antenna is very slight, for angles as great as 75° there is a substantial response. By comparing different angles of incidence $\theta1, \theta2$ in FIG. 2, it is seen that the phase of a resulting wave in either of the waveguides 36, 38 resulting from incidence of radiation on the related one of the surface wave antennas 22, 24 is a monotonic function of the angle at which the antenna received the radiation. It is this inherent monotonic phase response of each antenna which causes the phase of its resulting signals to vary in accordance with the angle of incidence, in contrast with prior art interferometers in which the phase difference is simply a trigonometric relationship relating to the fact that a given phase front will reach one of the antennas sooner than the other whenever the angle of incidence is other than at boresight. It is because phase difference of the signals created in a pair of back-to-back antennas is a monotonic function of the angle of incidence that the unambiguous operation (for ideal antennas) is achievable for any angle between $\pm \pi/2$.

Although described with respect to dielectric sheets on ground planes in FIGS. 1–3, surface wave antennas which may be combined so as to provide an unambiguous interferometer antenna system in accordance with the present invention may be of a large number of other forms, a number of which are referred to in Chapter 16 of Zucker (hereinbefore)

Another class of antennas which may be combined so as to provide an interferometer antenna system in accordance with the present invention comprises leaky-wave antennas which are also described in Chapter 16 of zucker. One form of such an antenna system 20b is illustrated in FIG. 4 as comprising a pair of leaky-wave antennas 44, 46 each fed by a respective waveguide 48, 50 and each disposed at an angle $\psi$ from boresight (illustrated by the arrow 52). The tilting is necessary since the phase front emanates from a leaky-wave antenna at an angle $\psi$ with respect to the antenna structure, and its boresight 52 is therefore commensurately at the angle $\psi$ from the antenna structure. By arranging both leaky-wave antennas 44, 46 at a suitable angle, the boresight will be the bisector of the structure as shonw in FIG. 4, in the reference plane. The antenna 44 illustrated in FIG. 4 has a slot 54 used for coupling radiation to and from the antenna; other forms of leaky-wave antennas are known, and may include a plurality of small slots or coupling holes appropriately disposed and sized so as to provide the leaky-wave antenna characteristics, as is described more fully in Chapter 16 of Zucker. The leaky-wave antennas, when ideal, provide precisely the same aperture distribution as the grounded surface wave antennas, and therefore provide the aperture distribution illustrated in FIG. 2 in accordance with the present invention. Thus, these antennas can be combined as shown in FIG. 4 so as to provide an inteferometer antenna having a wide unambiguous operating range.

Another type of antenna which may be combined so as to provide an unambiguous interferometer antenna system according to the present invention is a specially designed horn, such as, for instance, the type shown in the interferometer antenna system 20c illustrated in FIG. 5. In this implementation of the invention, the two individual antennas 56, 58 are disposed on opposite sides of and share a common, conducting reference plane 60, each antenna connnecting at the left end (as viewed in FIG. 5) with a related waveguide. Each antenna has a dielectric portion 62, 64 which includes a propagation constant matching section 66, 68, a waveguide mode-conversion section 70, 72 and a transition section 74, 76. The propagation constant matching sections 66, 68 tend to match the waveguide propagation constant or wave number to that of the antenna aperture per se. The mode conversion sections 70, 72 cause transverse standing waves to be created within the dielectric, whereas the air-filled regions on either side have transversely evanescent modes therein such that the mode tends to be substantially exponential above and below the dielectric portions 70, 72. In the transition sections 74, 76 the energy is caused to be substantially all transversely evanescent above the section 74 and below the section 76 such that the energy distribution at the related apertures (the right end as seen in FIG. 5) is substantially exponential (as seen in FIG. 2). The details of this exemplary, exponential horn phase interferometer antenna are disclosed and claimed in a commonly owned, copending application, Ser. No. 385,207, now U.S. Pat. No. 3,831,177, filed on even date herewith by An-Hwa Soong. It should be noted that, in the case of the exponential horn embodiment of FIG. 5, the aperture of the inteferometer antenna 20c is at the end of the horn structure; this should not be confused with the launching mechanisms 32, 34 which do not comprise the aperture of the surface wave antenna of FIG. 1, said aperture instead being in a vertical plane at the right-hand end of the dielectric surfaces 26, 28. However, the horn structure of FIG. 5 may in fact be used as a launching mechanism for a surface wave antenna of the type shown in FIG. 1, if desired.

An additional class of antenna structures which may be combined in pairs, so as to form an unambiguous interferometer antenna system according to the present invention, comprises arrays of large numbers of discrete, closely-spaced, individual radiating elements. For instance, the interferometer antenna system 20d illustrated schematically in FIG. 6 comprises two antennas 80, 82 each having a plurality of horns 86, which may be conventional horns having a cosine or other aperture distribution, and which are fed, in a corporate feed arrangement, by a pluralitty of power dividers of splitters 88, of any well known type, in such a fashion that the bulk of the energy is fed to the lowest horn of the upper antenna 82 and to the upper most horn of the lower antenna 82, and successively smaller amounts of energy are fed to horns disposed otuwardly thereof such that an exponential aperture distribution of the type illustrated in FIG. 2 is created by the total array of horns 86. It should be noted that it is the aperture distribution of the antennas 80, 82 and not that of the individual radiating elements (such as the horns 86) which provide the characteristics in accordance with the present invention. Instead of using a corporate feed as illustrated, the radiating elements or horns may be fed by slots in a series fed, loss-terminated array of horns, with the slot feeds being designed to couple more energy into the inboard horns and successively lower energy in the outer horns such as to achieve substantially the exponential aperture distribution as illustrated in FIG. 2. Instead of horns, the radiating elements may comprise dipoles, slots or other known radiating elements. The point is that the total antenna structure 20d has characteristics of two antenna sections 80, 82 such as to provide substantially the exponential distribution of FIG. 2. The selection, arrangement and feeding of individual radiating elements is in accordance with teachings well known in the art. One factor, however, is that although only eight horns 86 are shown for each antenna 80, 82 it is in practice desirable to provide a larger number of horns, perhaps in excess of twenty, for each of the antennas 80, 82. Further, rather than spacing them far apart as in prior art interferometers, the individual horns should be spaced relatively closely togethr (less than a quarter of a wavelength) so that the individual responses of each element 86 of each antenna 80, 82 will combine with the other responses of the other elements 86 in each antenna 80, 82 to provide an overall aperture distribution which is substantially exponential as shown in FIG. 2. The reference plane (dotted line 89) is normal to and between the two arrays. Of course, if the phases are not equalized, the arrays may require tilting as in FIG. 4.

To ensure a constant phase front across the aperture of a multi-horn array, the constant feed length, series feed of an antenna system 20e (FIG. 7) may be used. Therein, each horn 86 is fed by a transmission line 90 from a power splitter 92 positioned such that the feed length to each horn 86 is constant, and threfore the phase at all horns is substantially the same. Each power splitter has the same ratio of power to the horn versus power to the remainder of the array,, and therefore ensures substantially exponential operation; the ends of the feeds are terminated in lossey absorbers.

The sensitivity or scale factor of interferometer systems known to the prior art are shown in the solid line in the plot of FIG. 8. For angles of incidence ($\theta$) of more than 20°, the result is ambiguous since the electrical phase difference ($\Delta\theta$, about 100°) can also exist in the system for angles below 60°. Stated alternatively, for electrical phase differences ($\Delta\phi$) in excess of about 100°, it cannot be determined whether the related target is below 60° or above 20°. Therefore, a system employing a prior art antenna is ambiguous for angles of incidence greater than about ±20°. As shown in FIG. 8, the prior art scale factor at boresight is on the order of five electrical degrees per angle of incidence degree. If this scale factor were raised to on the order of 10, it can be seen that the prior art system would have substantially no useful range. This is due to the fact that the scale factor is linear in prior art systems for the useful portion of the scale factor surrounding boresight.

On the other hand, the dashed line in FIG. 8 illustrates an ideal system which has a very high slope or scale factor (on the order of 10 electrical degrees per angle of incidence degree) near boresight, and becomes less and less for increasing angles of incidence so that the entire scale factor curve is monotonic. In pratical applications, this cannot be achieved absolutely. For instance, surface wave antennas need to be of infinite dimensions in order to be ideal; when truncated to practical dimensions, less than perfect surface waves are obtained so that the aperture distribution is less than perfectly exponential across the entire aperture. Similarly, since the reference plane between a pair of surface wave antennas must have a finite thickness in a practical system, there can be no aperture amplitude at the reference plane (as is required for the ideal situation illustrated in FIG. 2). Similarly, the reference plane 60 in the embodiment of FIG. 5 has a finite dimension thereby reducing the aperture amplitude to zero at the reference plane. Because of these and other practical considerations, interferometer antennas practicing the present invention may not necessarily be able to achieve the ideal scale factor illustrated by the dashed lines in FIG. 8, but may instead only achieve the scale factor indicated by the dotted line in FIG. 8. However, it can be seen that for electrical phase differences ($\Delta\phi$) as high as about 160°, the result is unambiquous, so that an antenna system in accordance with the present invention has an unambiguous range of on the order of ±50°. And this is achievable without the use of ambiguity elimination electronics, which is required in the prior art in order to reach unambiguous operation over ±20° as shown by the solid line in FIG. 8.

Although the invention has been shown and described with respect to exemplary embodiments thereof, it should be understood by those skilled in the art that other exponential aperture antennas may be employed and that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. A phase interferometer antenna system comprising a pair of separately fed antennas disposed on opposite sides of a common reference plane in mirror image relationship with a substantially common boresight, each of said pair of antennas having an aperture normal to said reference plane, the aperture of each of said pair of antennas existing wholly on one respective side of said reference plane, the total aperture distribution of one of said antennas being substantially of the from of $Ae^{-\alpha y}$ and the total aperture distribution of the other of said antennas being substantially of the form of $Ae^{-\alpha y}$, where $A$ is equal to the maximum amplitude of the aperture distribution, $e$ is the Naperian operator, $y$ is the distance to a point along the aperture from said reference plane, and $\alpha$ is an attenuation constant of the aperture distribution of each of said antennas, whereby each of said antenna is inpendently and differently phase sensitive to angle of incidence.

2. A phase interferometer antenna system according to claim 1 comprising a pair of surface wave antennas disposed on opposite sides of an isolating plane coextensive with said reference plane.

3. A phase interferometer antenna system according to claim 1 wherein each of said pair of antennas comprises a leaky wave antenna disposed at an angle with respect to said reference plane.

4. A phase interferometer antenna system according to claim 1 wherein each of said pair of antennas comprises a single radiating horn having an exponential aperture distribution across a substantial portion of its aperture.

5. A phase interferometer antenna system according to claim 1 wherein each of said pair of antennas comprises an array of a large number of closely spaced individual radiating elements, said radiating elements being differently coupled for a different reception response characteristic in each of said elements in a manner that the overall response to all of said elements includes an exponential aperture distribution across a substantial portion of the aperture.

* * * * *

PO-1050
(5/69)

UNITED STATES PATENT OFFICE
CERTIFICATE OF CORRECTION

Patent No. 3,860,934            Dated January 14, 1975

Inventor(s) Bernard Ru-Shao Cheo, Lester H. Kosowsky, Peter W. Smith, An-Hwa Soong It is certified that error appears in the above-identified patent and that said Letters Patent are hereby corrected as shown below:

Column 1, line 14, after "system thereof" delete -- system thereof --

Column 1, line 57, after "phase" delete -- of --

Column 2, line 9, after "of" delete -- isolated --

Column 2, line 11, after "of" insert -- isolated --

Column 3, line 6, after "cause" delete -- is --

Column 3, line 6, after "cause" insert -- signals --

Column 3, line 35, "180°" should read -- -180° --

Column 3, line 54, "form" should read -- from --

Column 4, line 3, "=20°" should read -- -20° --

Column 4, line 8, "90°" should read -- +90° --

Column 5, line 16, "each" should read -- *each* --

Column 5, line 24, "$\Delta\phi(\theta) = 2 \tan^{-1} (\beta\sin\theta/\alpha$" should read -- $\Delta\phi(\theta) = 2 \tan^{-1} (\beta\sin\theta/\alpha)$ --

Column 6, line 6, "S   132-S296" should read -- S132-S296 --

Column 7, line 14, "zucker" should read -- Zucker --

Column 7, line 24, "shonw" should read -- shown --

Column 8, line 26 "pluralitty" should read -- plurality --

(cont'd)

PO-1050
(5/69)

UNITED STATES PATENT OFFICE
CERTIFICATE OF CORRECTION

Patent No. 3,860,934  Dated January 14, 1975

Inventor(s) Bernard Ru-Shao Cheo, Lester H. Kosowsky, Peter W. Smith
An-Hwa Soong It is certified that error appears in the above-identified patent and that said Letters Patent are hereby corrected as shown below:

Column 8, line 26, "of" should read -- or --

Column 8, line 31, "otuwardly" should read -- outwardly --

Column 8, line 59, "togethr" should read -- together --

Column 9, line 6, "threfore" should read -- therefore --

Column 9, line 9, "array,," should read -- array, --

Column 9, line 16 "θ" should read -- φ --

Column 10, line 25, "from" should read -- form --

Column 10, line 28, "$Ae^{-\alpha y}$" should read -- $Ae^{\alpha y}$ --

Column 10, line 33, "antenna" should read -- antennas --

Column 10, line 33, "inpendently" should read -- independently --

Column 10, line 56, "to" should read -- of --

Signed and sealed this 11th day of March 1975.

(SEAL)
Attest:

RUTH C. MASON
Attesting Officer

C. MARSHALL DANN
Commissioner of Patents
and Trademarks